US008009707B2

(12) United States Patent
Johnson

(10) Patent No.: US 8,009,707 B2
(45) Date of Patent: Aug. 30, 2011

(54) DUAL MODE SINGLE CAVITY PULSE COMPRESSOR

(76) Inventor: Ray M. Johnson, Shady Cove, OR (US)

( * ) Notice: Subject to any disclaimer, the term of this patent is extended or adjusted under 35 U.S.C. 154(b) by 2 days.

(21) Appl. No.: 12/714,034

(22) Filed: Feb. 26, 2010

(65) Prior Publication Data

US 2010/0156571 A1 Jun. 24, 2010

Related U.S. Application Data

(62) Division of application No. 10/932,631, filed on Sep. 1, 2004, now Pat. No. 7,720,115.

(60) Provisional application No. 60/499,797, filed on Sep. 2, 2003.

(51) Int. Cl.
*H01S 3/10* (2006.01)

(52) U.S. Cl. ................. 372/25; 372/28; 372/30; 372/69

(58) Field of Classification Search .................... 372/25, 372/28, 30
See application file for complete search history.

(56) References Cited

U.S. PATENT DOCUMENTS 5,796,314 A * 8/1998 Tantawi et al. ................. 333/20
6,724,782 B2 * 4/2004 Hartemann et al. .............. 372/5

* cited by examiner

*Primary Examiner* — Dung T Nguyen
(74) *Attorney, Agent, or Firm* — Donald L. Beeson

(57) ABSTRACT

An rf pulse compressor has a single high Q cavity resonator fed by a four port hybrid coupler which is connected to the resonator at coupling ports located at the intersection of two of the resonator's orthogonal axes with the resonator cavity walls. The hybrid coupler divides pulse power from an rf pulse power source and excites two space and phase orthogonal modes in the single cavity, the stored energy of which aids in producing compressed pulses at the output of the hybrid. On-axis perturbations in the cavity walls can be used to lock the orthogonal orientation of the modes excited in the cavity.

13 Claims, 7 Drawing Sheets

DUAL MODE SINGLE CAVITY PULSE COMPRESSOR

CROSS REFERENCE TO RELATED APPLICATIONS

This application is a division of application Ser. No. 10/932,631 filed Sep. 1, 2004, which claims the benefit of provisional application Ser. No. 60/499,797 filed Sep. 2, 2003, which are hereby incorporated by reference.

BACKGROUND OF THE INVENTION

The present invention generally relates to techniques for rf pulse compression and more particularly to high power pulse compressors using cavity resonators to store and release pulse power in the aid of pulse compression.

High Q cavity resonators are used in pulse compressors to store a significant part of the energy from an amplified pulse received from an rf pulse power source. During a "fill time," the pulse power incident on an aperture in the cavity resonator has part of this power reflected and the remaining part coupled to the cavity. Some of the power coupled to the cavity is dissipated in the cavity walls, while the balance builds energy in the cavity resonator. By abruptly reversing the phase of the rf power source, the energy stored in the resonator cavity is released and effectively combined with the power from the rf source to yield an increase in peak power output at a reduced pulse length.

The high Q cavity resonators such as used in high power pulse compressor systems have typically been cylindrical cavities for supporting modes of the $TE_{01n}$ family. These modes have electric fields that do not terminate on the cavity walls. Hence, electron emission and multipactor effects are significantly reduced as compared to many other modes.

An example of the use of high power rf pulse compressors is the SLED (Stanford Linear Energy Doubler) system used by the Stanford Linear Accelerator (SLAC) to increase the energy in the beam used for particle acceleration. SLED uses pulse compressors comprised of two cylindrical cavity resonators operating in a single mode, and a four port 3 db sidewall hybrid having ports conventionally denoted ports 1, 2, 3, 4. In this type of system, pulse power fed into port 1 of the sidewall hybrid is divided equally into ports 2 and 3 with a phase difference of 90° between Ports 2 and 3. The output from port 2 couples to one of the cylindrical cavity resonators, while the output from port 3 is coupled to the other of the cylindrical cavity resonators. The transmission line lengths used to feed the two resonator cavities of the SLED system are equivalent to maintain the 90° phase differential at and within the cavities.

In the SLED system, each cavity reflects essentially all of the incident power at the start of the filling pulse. The reflection travels back to the hybrid and combines to exit the hybrid at the hybrid's port number 4. As the cavity starts to fill, less power is reflected and more power is coupled. All this is a function of time, frequency, cavity Q, and coupling coefficient in a predictable manner. After an appropriate fill time interval, the phase of the rf power to hybrid port 1 is reversed. (This is usually accomplished by reversing the phase of the drive to the rf power source, such as a klystron amplifier.) Immediately after phase reversal, the following occurs at the cavities: (1) the incident power is completely reflected, and (2) power is emitted from the cavity's stored energy. The phase of the reflected power and the emitted power are equal at a given cavity, so that the voltages add. Consequently, the power traveling from a cavity to the hybrid increases as the square of this voltage. The hybrid serves to combine the reflected power and power released from energy stored in the cavities, and to deliver this power to port 4 of the hybrid.

In another type of pulse compression system a single resonator cavity is fed by a 3 port circulator instead of a 4 port hybrid. In this case, power from the rf source is fed into port 1 of the circulator and emerges out of port 2. Port 2 is connected to a transmission line that is, in turn, coupled to the cavity resonator to build energy in the single cavity during the pulse fill time. Upon reversal of polarity of the input pulse power at port 1 of the circulator, the stored energy released from the single cavity resonator is released to aid in the production of a compressed output pulse, which is conveyed out of port 3 of the circulator to a load.

The advantage of a single cavity/circulator system is that it eliminates the need for the two cavity resonators used in the SLED system. A disadvantage is that circulators are more complex and costly as compared to four port hybrids. Also, because all of the energy is stored in a single mode in one cavity, the peak electric field within the cavity of the circulator fed single cavity system is increased by the square root of 2 over the two cavity/hybrid pulse compressor. The power level in the feed line connected to port 2 of the circulator is also increased.

The present invention provides the benefits of both of the above described pulse compression systems into a single system. That is, the invention involves a single cavity resonator that is hybrid fed. Thus, the maximum electric fields in the cavity resonator and the feed arms to the resonator are equivalent to the two cavity/hybrid system. A hybrid can be used instead of the more costly circulator, and a single cavity resonator is required instead of two.

SUMMARY OF THE INVENTION

Briefly, the invention is directed to a pulse compression system for rf applications, and a dual mode single cavity resonator for such pulse compression systems. The invention is further directed to a pulse compression method for using a single cavity resonator.

The pulse compression system of the invention includes a single high Q cavity resonator having conductive cavity walls, which is rotationally symmetrical about at least two orthogonal axes. The cavity resonator includes a first coupling port in the cavity walls at the intersection of the walls with one of the cavity resonator's axes, and a second coupling port in the cavity resonator walls at the intersection of the walls with another one of the cavity resonator's axes, such that the coupling ports are 90 degrees apart. In the preferred embodiment, the cavity resonator is a spherical cavity resonator, however, it is contemplated that other symmetrical cavity resonator geometries could be used, such as a cube form.

In the system of the invention, a power dividing circuit is provided for dividing pulse power from a pulse power input between the first and second coupling ports of the single cavity resonator, such that the divided power excites two space orthogonal modes in the resonator cavity. In a further aspect of the invention, the power dividing circuit includes a phase shifting circuit for phase shifting the divided pulse power delivered to the coupling ports of the cavity resonator such that the two space orthogonal modes excited in the single cavity resonator are also phase orthogonal, that is, 90 degrees out of phase. The power dividing and phase shifting circuit is connected to a power output which, upon reversal of the polarity of the input pulses after a cavity resonator fill time, acts to combine power reflected from the resonator with power emitted from the energy in the two orthogonal modes excited in the cavity resonator to produce compressed pulses for delivery to the power output.

In a further aspect of the invention, at least two mode orienting perturbations are provided in the cavity walls of the cavity resonator at locations that fix the orthogonal orientation of the modes in the cavity resonator that are excited through its first and second coupling ports. In still a further aspect of the invention, the perturbations can include movable tuning elements for tuning the cavity resonator.

DETAILED DESCRIPTION OF THE ILLUSTRATED EMBODIMENT

Figure 1:
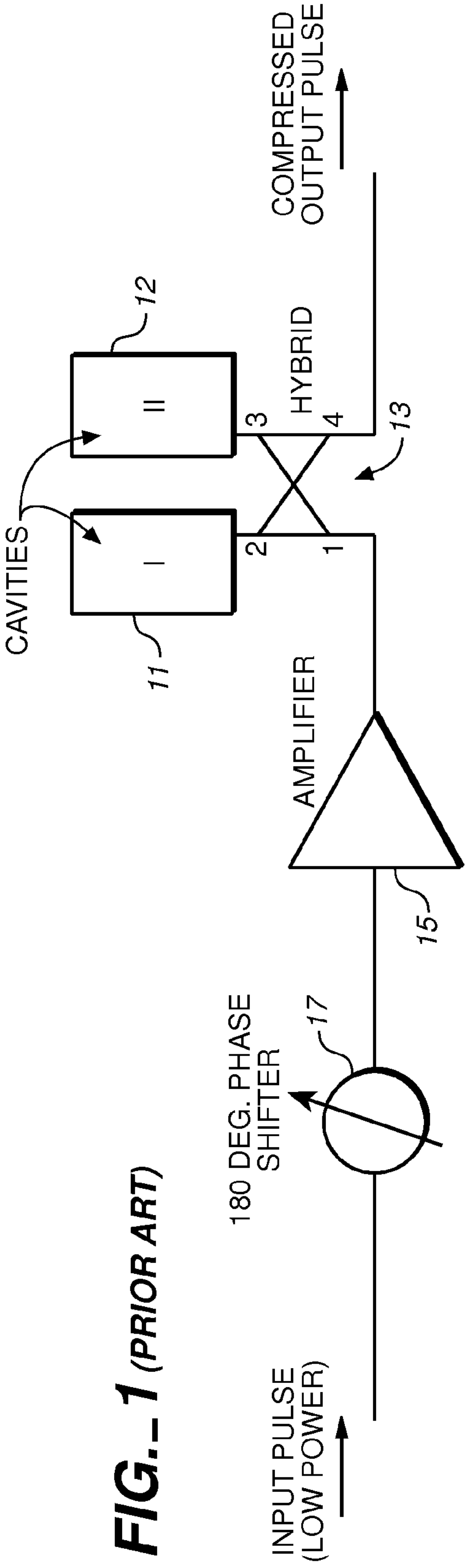
FIG. 1 (PRIOR ART)
FIG. 1 is a circuit diagram of a prior art rf pulse compression system using two cylindrical cavity resonators fed from a four port hybrid coupler.
Figure 2:
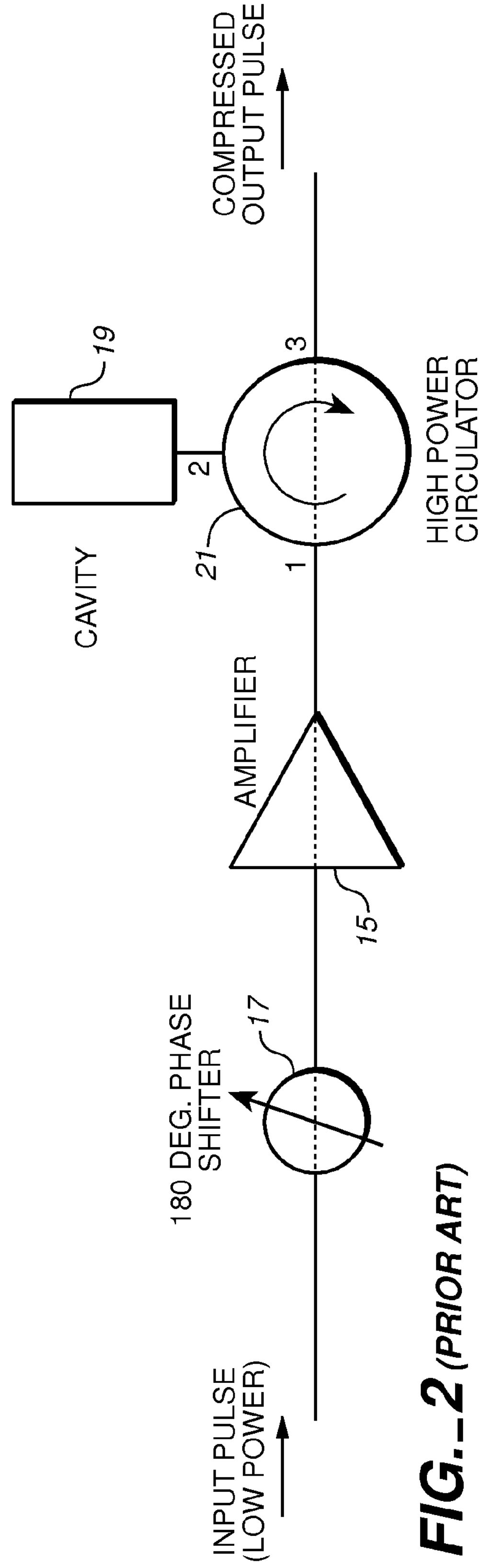
FIG. 2 (PRIOR ART)
FIG. 2 is a circuit diagram of a prior art rf pulse compression system using a single cavity resonator operating in a single mode fed by a 3 port circulator.

Referring now to the drawings, FIGS. 1 and 2 illustrate prior art pulse compression systems for rf applications, which include microwave applications. In FIG. 1, two cylindrical cavity resonators 11, 12 are fed by a four-port 3 db hybrid coupler 13 having ports denoted a 1, 2, 3, and 4. Amplifier 15, suitably a klystron, receives and amplifies low power input pulses and sends the amplified pulse power to port 1 of the hybrid. The hybrid, in turn, takes the amplified pulse power and divides it between hybrid ports 2 and 3, which are used to feed the two cavity resonators 11, 12. Within the hybrid coupler, the divided power is phase shifted be 90 degrees. The transmission line lengths between the hybrid and the two cavity resonators are chosen to maintain this 90 degree phase differential at and within the resonators. The 180 degree phase shifter 17 is used at the low power input side of the amplifier to reverse the polarity of the input pulse after an appropriate fill time. The compressed pulse, which is the sum of the stored energy in the cavity resonators and reflected power, emerge from port 4 of the hybrid coupler. The compressed pulse is directed to a load, such as an accelerator or antenna (not shown).

In FIG. 2, the compressed pulse is produced from a single cavity resonator 19 fed by a three port high power circulator 21 having an input port denoted 1, and output port denoted 3, and a port denoted 2 for feeding the system's resonator cavity. As in the prior art pulse compression system illustrated in FIG. 1, the low power input pulses are amplified by an amplifier 15 and go through a polarity reversal after a fill time by means of phase shifter 17. With this pulse compressor, all of the stored energy for producing the compressed pulse is stored in a single mode within the cavity 19, thereby greatly increasing peak electric field strengths within the cavity as above-described. There is also a doubling of power at port 2 of the circulator.

In accordance with the present invention, a pulse compression system is provided using a single cavity resonator which is rotationally symmetrical about at least two orthogonal axes and which is fed from two different feed locations for exciting two orthogonal modes within the resonator cavity. As hereafter described, only one mode is excited in the resonator cavity from each feed location. The object is to store energy in the two excited modes which aids in the production of compressed pulses, and to do so without cross-coupling between modes.

An attractive form for the cavity resonator is a spherical or sphere like cavity i for high Q resonators. A sphere has a minimum of surface to volume ratio and requires minimum wall thickness for pressure or vacuum applications to cylinders. It also means that the resonator cavity will have a smaller mass which is advantageous for air born or cryogenic applications. Although the Q may not be as high as in the case of long cylindrical structures, the size of the cavity resonator is considerably smaller.

While spheres are considered the preferred geometry for the cavity resonator of the invention, it will be understood that other geometries could be used as well, provided the cavity resonator is symmetrical about at least two orthogonal axis so that it can be rotated through any 90 degree angle about the two axes without changing the cavity from its original position. An example of such a symmetrical cavity would be a cube-shaped cavity or an oblong football shape.

Figure 3:
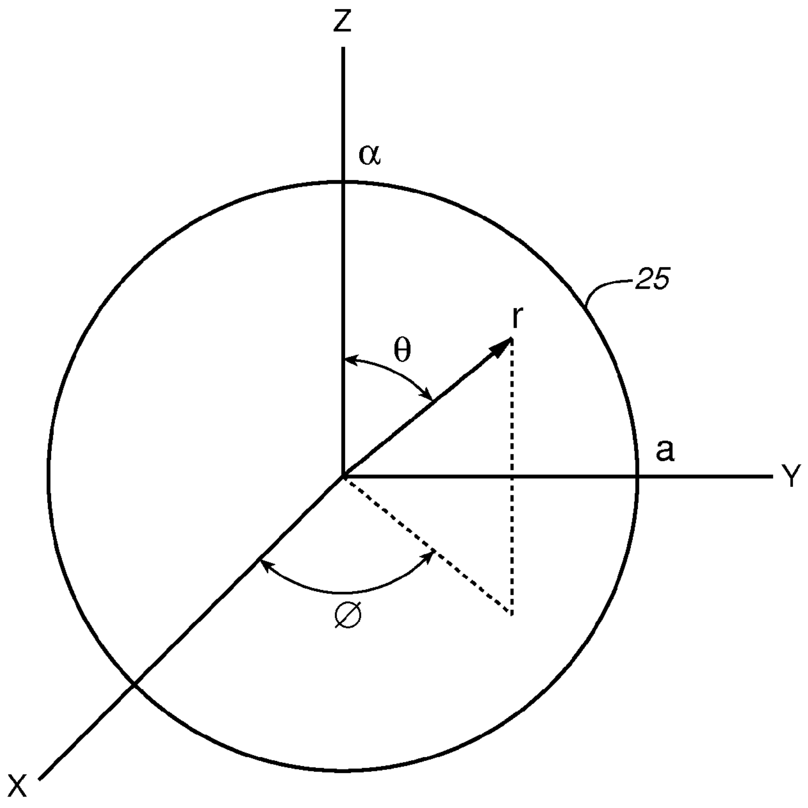
FIG. 3 is a graphical representation of a spherical cavity resonator showing the orthogonal coordinates for the cavity.
Figure 4A:
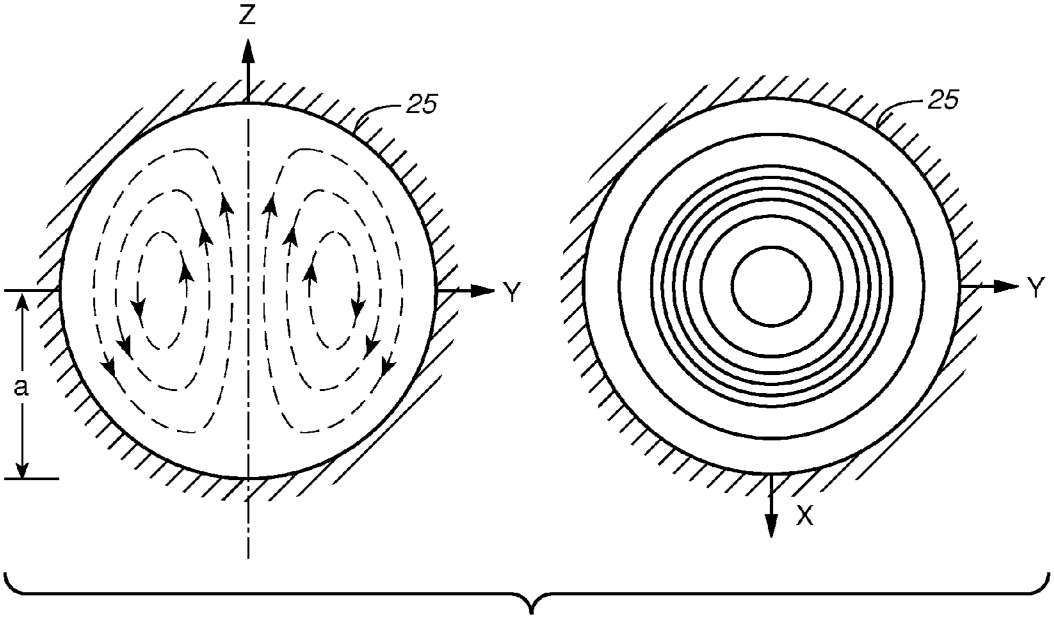
FIG. 4A is a graphical representation of the magnetic and electric field lines for one $TE_{011}$ mode in the spherical cavity resonator shown in FIG. 3. In this mode the magnetic field lines are oriented in the direction of the cavity's z-axis.
Figure 4B:
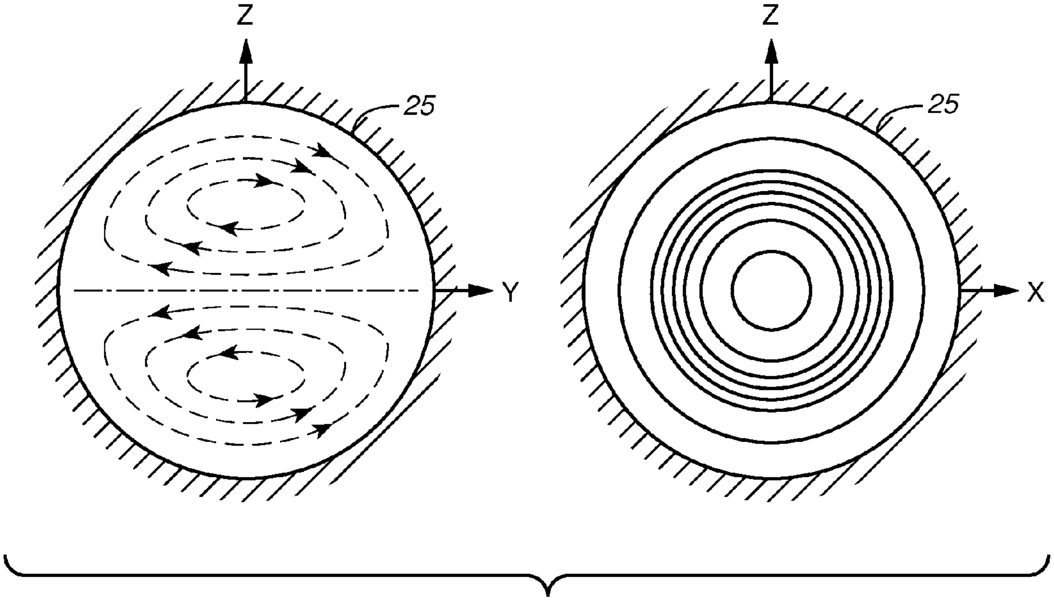
FIG. 4B is a graphical representation of the magnetic and electric field lines of a second $TE_{011}$ mode in the spherical cavity shown in FIG. 4A, wherein the mode is rotated 90 degrees in space from the mode illustrated in FIG. 4A. In this mode the magnetic field lines are oriented in the direction of the cavity's y-axis.

The dual modes excited in the single cavity resonator of the present invention can further be described in reference to FIGS. 3, 4A and 4B. It can be seen that a spherical cavity 25 represented in these figures supports two $TE_{mnp}$ type modes that are orthogonal in space and phase to one another with m=0. FIG. 3 illustrates the geometry of the spherical cavity. It is noted that setting m=0 indicates zero variations in the electric field as one progresses through the angle $\phi$, while n and p indicate the number of variations in, respectively, the angle $\theta$ and the radial direction r. For simplicity, the integers n and p are set equal to 1, to represent the $TE_{011}$ mode.

In the illustrated spherical cavity 25, three $TE_{011}$ modes are degenerate, that is, resonate at the same frequency defined by $f_{011}=(4.493/2\pi a)c$, where a=sphere radius, and c=velocity of light. These three modes have the same mode patterns that are rotated 90 degree in space relative to each other. FIGS. 4A and 4B show two of these orientations, that is, the orientations for two separate orthogonal modes in a spherical cavity. In FIGS. 4A and 4B, the left hand graphics shows the two modes' magnetic filed patterns in dashed lines, and the right hand graphic shows the modes electric field patterns in solid lines. In FIG. 4A the magnetic fields for the represented mode are oriented in the z-axis direction, while in FIG. 4B the magnetic fields are oriented in the y-axis direction. Since the ideal modes are orthogonal in space, they will not couple to each other. Coupling is also suppressed due to the fact that the feeding the dual mode cavity resonator from a hybrid coupler excites the modes in phase quadrature, that is, such that there is a 90 degree phase difference in their fields. (Phase quadrature is sometimes referred to herein as "phase orthogonal.")

Figure 5:
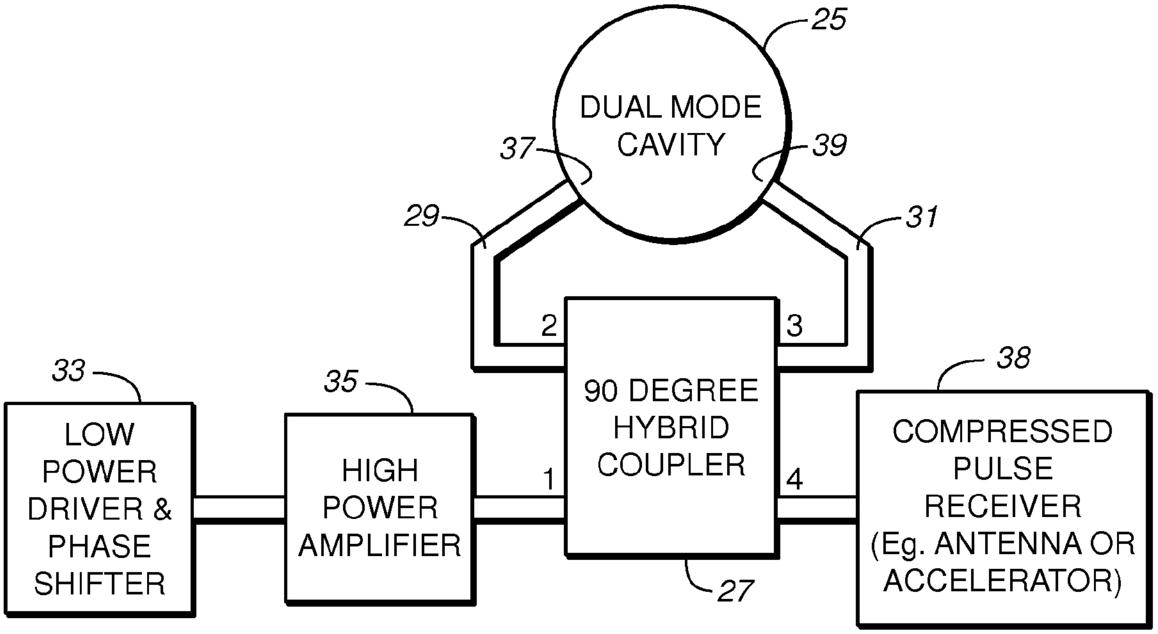
FIG. 5 is a block representation of a pulse compression system in accordance with the invention wherein a 90 degree hybrid coupler feeds a dual mode single cavity resonator.

FIG. 5 illustrates a pulse compression system in accordance with the invention utilizing a spherical cavity resonator which supports orthogonal TE modes, such as the $TE_{011}$ modes illustrated in FIGS. 4A and 4B. Referring to FIG. 5, the spherical, dual mode cavity 25 is connected to ports 2, 3 of four port hybrid coupler 27 (again with ports denoted 1, 2, 3, 4) by means of two equal length transmission lines 29, 31. Input pulses are provided from and through a low power driver and phase shifter 33 to the input of a high power amplifier 35, which feeds pulse power to port 1 of hybrid coupler 27. The hybrid coupler divides and phase shifts the pulse power supplied from the output of amplifier 35 and passes this power to the two transmission lines 29, 31, which, in turn, feed the divided and phase shifted pulse power to the dual mode cavity resonator 25 through the resonator's two coupling ports 37, 39.

With reference to the two orthogonal modes illustrated in FIGS. 4A and 4B, the coupling ports 37, 39 of the cavity resonator 25 shown in FIG. 5 would be located at the intersection of the x and y axes of the cavity resonator with the cavity resonator walls. That is they are spaced 90 degrees apart, and each is located in the area of maximum magnetic field strength for one mode and the minimum (essentially zero) magnetic field strength for the other orthogonal mode. Thus, the pulse power incident on either one of the coupling ports will magnetically couple to one mode, but not the other.

The compressed pulse produced by the energy stored in the two orthogonal modes excited in the dual mode cavity resonator deliver to a compressed pulse receiver or load 38, such as an antennae or accelerator, from port 4 of the hybrid coupler.

Figure 6:
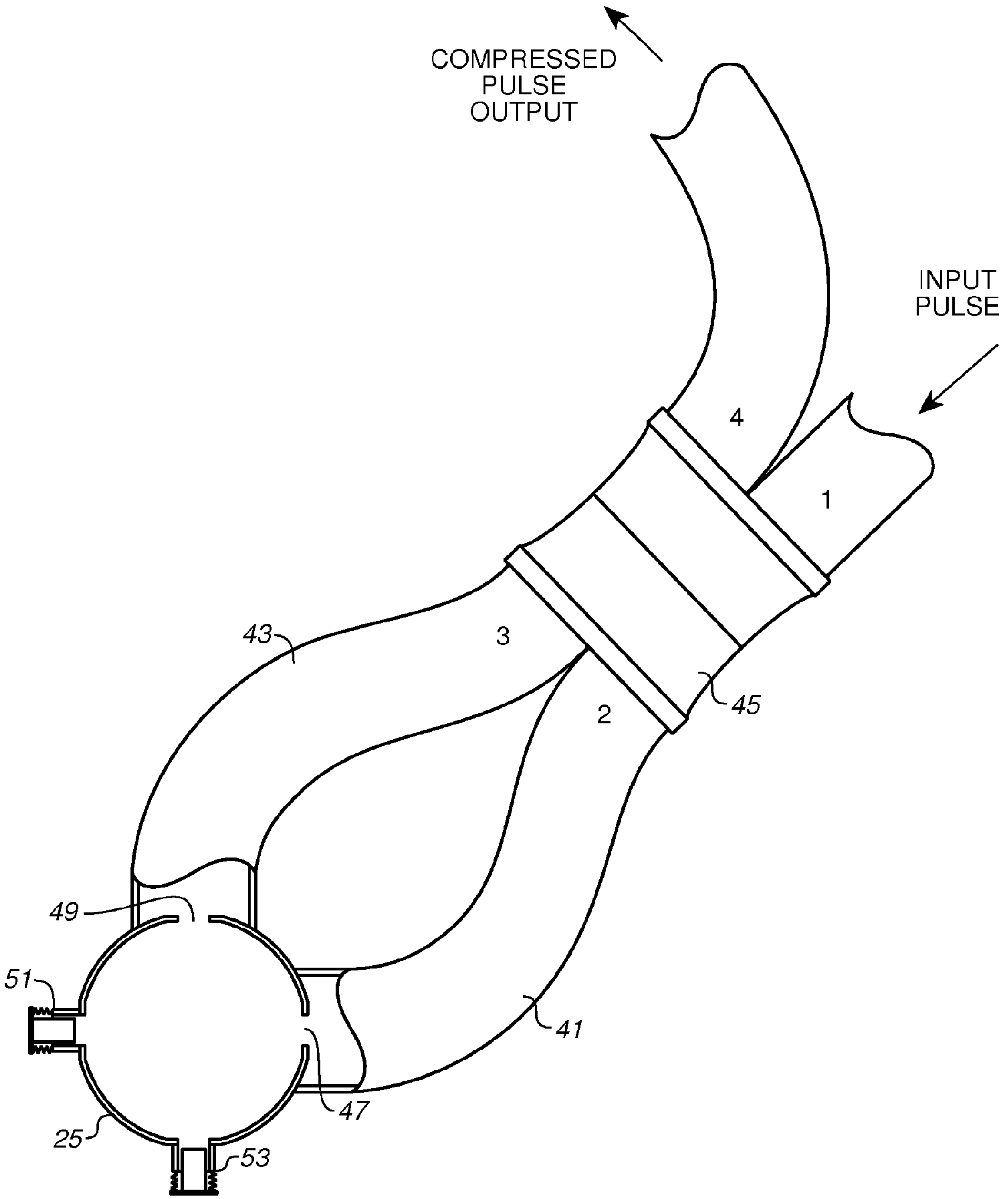
FIG. 6 is a graphical representation of a single cavity dual mode pulse compression system in accordance with the invention, wherein the cavity resonator is fed from two waveguide feeds and wherein the cavity resonator is provided with tuning plugs.

FIG. 6 shows in greater detail a spherical cavity resonator, such as the spherical cavity resonator graphically illustrated in FIG. 5, fed by two equal length waveguide transmission lines 41, 43, which are connected to ports 2 and 3 of a four port sidewall hybrid coupler 45. (As FIG. 5, the hybrid's input port is denoted as port 1 and its output port 4.) The waveguide transmission line 41 is connected to coupling port 47 of spherical cavity 25, while waveguide transmission line 43 is connected to the cavity resonator's coupling port 49 located at a position 90 degrees from the coupling port 47. Suitably, the coupling ports are circular apertures in the cavity resonator walls, which permit transverse magnetic fields in the waveguide transmission lines to couple to the magnetic fields of the properly oriented orthogonal modes in the resonator cavity. Tunable slugs 51, 53 for tuning the resonant frequency of modes excited within the cavity resonator are provided opposite each of the coupling ports. Again with reference to the graphical mode representations in FIGS. 4A and 4B, it can be seen that two orthogonal modes will be excited in the cavity resonator 25 by coupling to the area of maximum magnetic field strength for each orthogonal mode. Each of the opposed on-axis tunable slugs will also be located in an area of maximum field strength for one the respective modes. As hereafter described, the tuning slugs will provide perturbations in the cavity walls, which aid to lock the orthogonal orientation of the modes in the cavity.

As an example, the wave guide fed spherical resonator shown in FIG. 6 can have a nominal 5.8" diameter cavity fed by WR284 wave guide. The sidewall hybrid 45 can be a slot sidewall hybrid for driving two orthogonal $TE_{011}$ modes at 2.9 GHz. The opposed tuning slugs 51, 53 can be used to tune the orthogonal modes to the driving 2.9 GHz microwave frequency. The modes would be over-coupled. The room temperature and liquid nitrogen Q's for copper are 58,000 and 190,000, respective, at this frequency.

Figure 7:
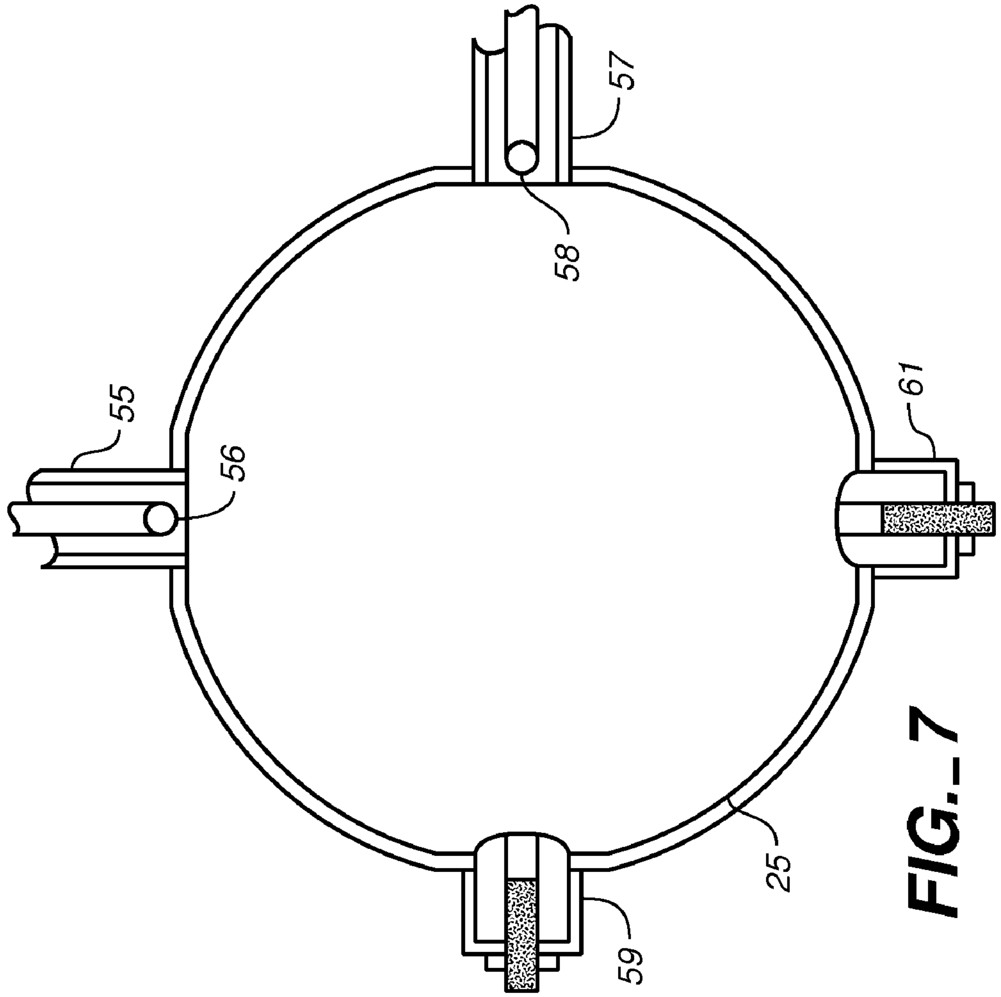
FIG. 7 is a graphical representation of a cavity resonator for a pulse compression system in accordance with the invention with loop coupling coax line feeds and diaphragm frequency tuning.

FIG. 7 illustrates a spherical resonator cavity 25 fed from a coaxial ring hybrid (not shown) with appropriate line lengths. In this embodiment, coax feed lines 55, 57 are connected to the coupling ports 56, 58 of the cavity resonator to provide loop coupling for exciting the dual modes in the spherical cavity. Diaphragm tuning elements 59, 61 in the walls of the spherical cavity opposite the coax coupling ports are used to tune the modes excited within the cavity.

Figure 8:
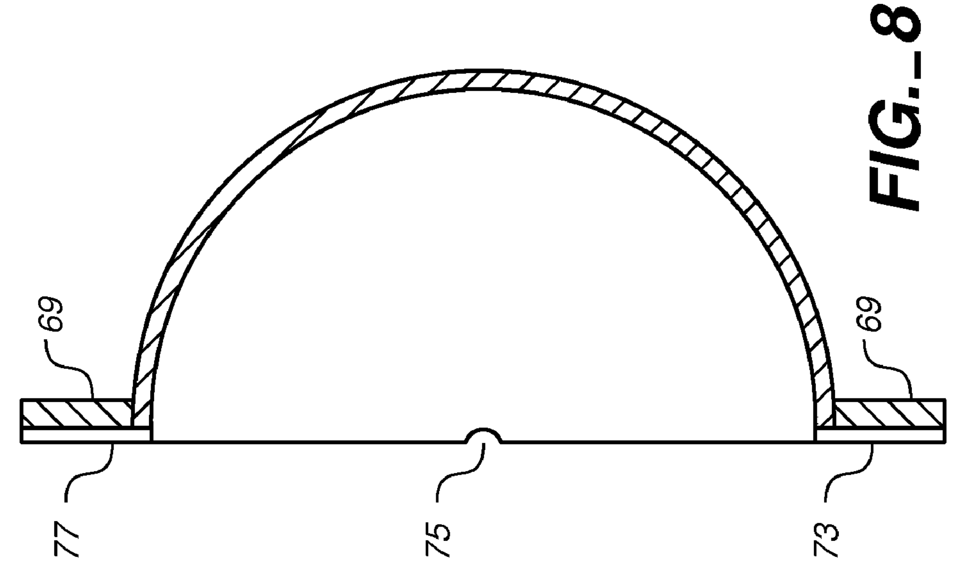
FIG. 8 is a cross-sectional view in side elevation of one of two flanged hemispheres used to form a spherical cavity resonator in accordance with the invention.
Figure 10:
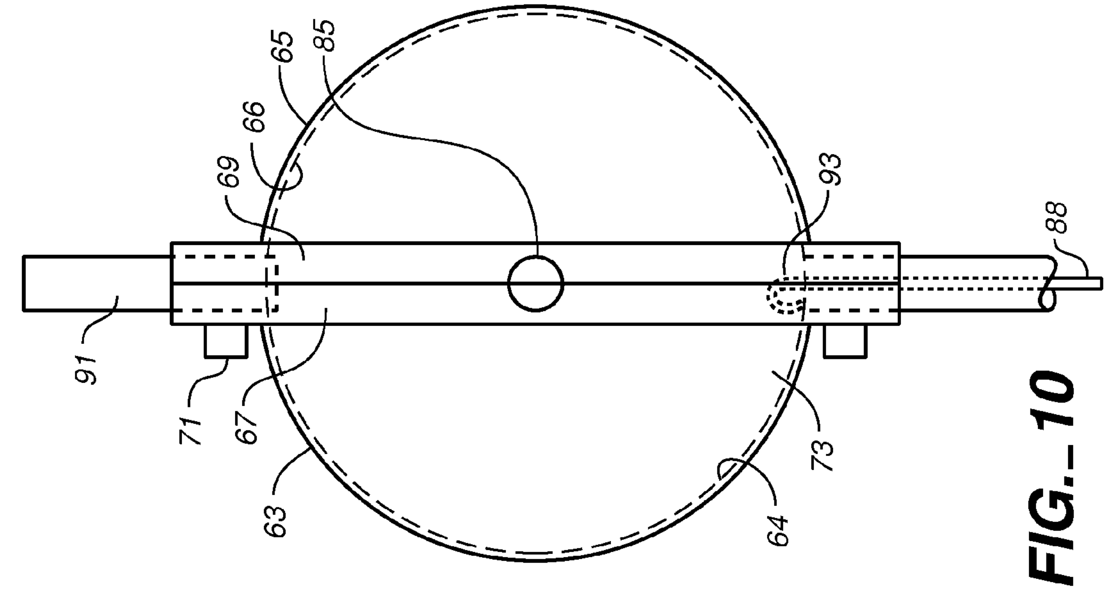
FIG. 10 is a side elevational view of the cavity resonator shown in FIG. 9.

FIGS. 8 and 10 show the construction of a spherical cavity resonator 25 from two hemispheres 63, 65 having cavity walls 64, 66 and circular flanges 67, 69. The hemispheres, which are suitably fabricated of brass with copper coated cavity walls (or possibly a superconducting material), are secured together by bolts 71, which insert through clearance holes in flange 67 and screw into threaded holes (not shown) in flange 69. The flange of each hemisphere has four radial slots on the face of the flange spaced 90 degrees apart. Three of these slots 73, 75, 77 are shown in FIG. 8. Each slot has a semi-cylindrical shape so that when the flanges are clamped together with opposing slots facing each other, the slots form four circular ports 79, 81, 83, 85, which extend from the outer edge of the joined flanges to the resonator's interior spherical cavity 73. The ports are spaced 90 degrees apart and thus fall on two orthogonal axes of the cavity resonator. Two of the ports 79, 81, spaced apart by 90 degrees, serve as coupling ports, and the other two ports 83, 85 serve as tuning ports. Coax feed lines 87, 89 having insulated center conductor wires 88, 90 are inserted into the coupling ports 79, 81. The remaining two ports 83, 85 are provided with metal tuning rods, such as the illustrated tuning rod 91 inserted into port 83, which can be moved to tune the resonator cavity to the driving frequency. It can be seen that the center conductor wires of the coax feed lines extend into the cavity and are bent into loops 93, 95 lying in perpendicular planes. The ends of the center wires are suitably soldered to the outer conductive shields (not shown) of the coax feed lines.

Figure 9:
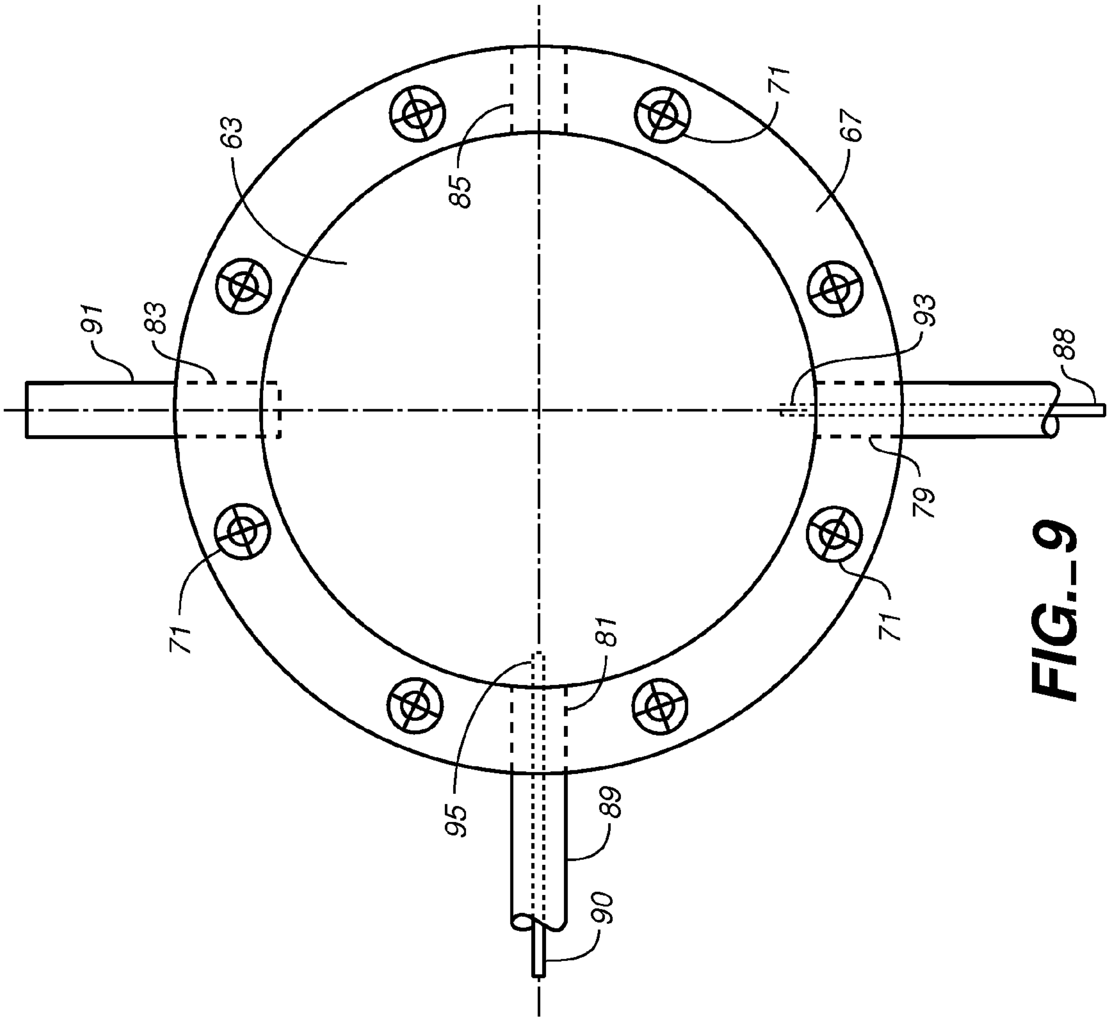
FIG. 9 is a top plan view of a cavity resonator for use in a pulse compression system in accordance with the invention formed by joining two flanged hemispheres and having loop coupling coax line feeds.

With reference to the modes and coordinate system shown in FIGS. 4A and 4B, the coax loop 93 of the resonator cavity shown in FIGS. 9 and 10, lies in the x-z plane for exciting the $TE_{011}$ mode shown in FIG. 4B, while the coax loop 95 lies in x-y plane for exciting the space orthogonal $TE_{011}$ mode shown in FIG. 4A. Both coax loops are positioned in the area of maximum magnetic field strength for each of the orthogonal modes, and minimum of the other, and, when connected to a hybrid coupler, both will couple divided pulse power to these modes in a time quadrature relationship. Because the geometries are not perfect which might include small variations in the coupling loops, a small amount of energy may be coupled into an undesired third orthogonal $TE_{011}$ mode, however, this spurious mode will be greatly attenuated and should fall outside of the bandwidth of the desired resonances. Also, the tuning rods can be used to minimize the effects of geometric anomalies in the resonator.

To provide good conductivity across the joint 97 of the two hemispheres, lengths of indium wire are suitably inserted into the joint between ports 79, 81, 83, 85, before the hemispheres are clamped together. Indium wire is conductive and malleable, and will be mashed down by the clamping forces of the flanges.

Figure 12:
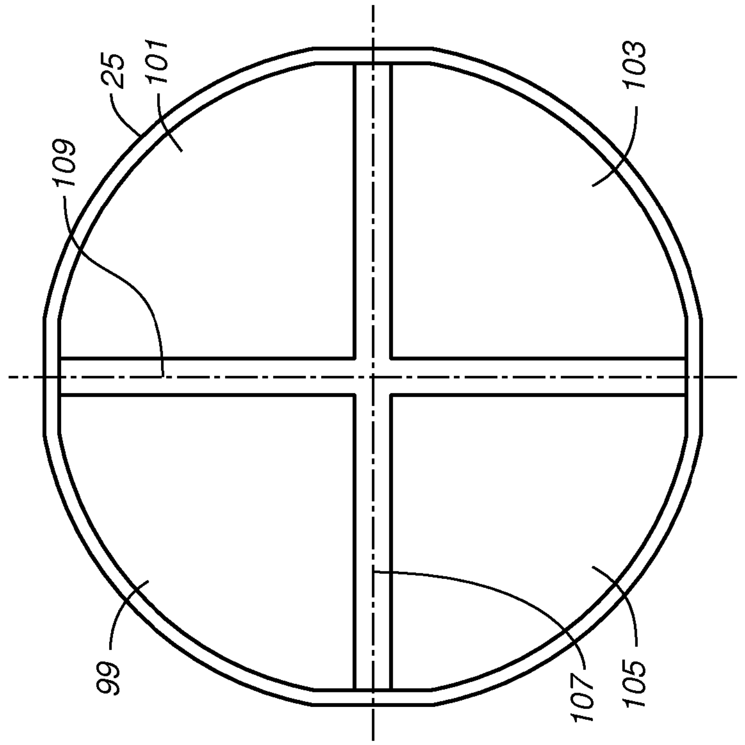
FIG. 12 is a graphical representation of a spherical cavity resonator with octant separations in the cavity walls of the resonator.
Figure 11:
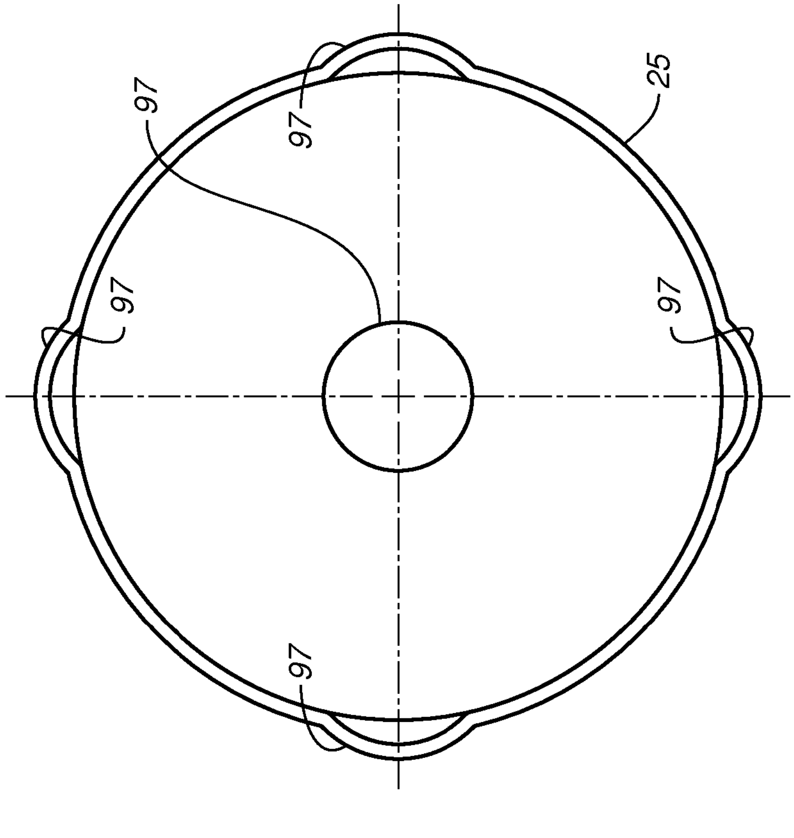
FIG. 11 is a graphical representation of a spherical cavity resonator with outward perturbations in the cavity walls at the intersection of the orthogonal axes of the resonator.

FIGS. 11 and 12 show two generalized approaches for "locking" two modes excited in a spherical cavity resonator in their desired fixed orthogonal orientations. Such locking of the mode orientation is achieved by perturbations added to at the axes positions of the resonator's cavity. The mode orienting function of these perturbations is best described in reference to FIGS. 3, 4A and 4B.

For a desired $TE_{011}$ mode oriented with the axial magnetic field in the z-direction as shown in FIG. 4A, perturbations at the sphere surface at z=a and −a(x=y=o) will have minimal effect on the mode since both magnetic and electric fields are zero at this position. The same perturbations at the surface on the x and y axis will perturb the strong magnetic field. Perturbations inward will raise the resonant frequency while outward perturbations will lower the resonant frequency. If coupling is provided at these strong magnetic field positions, the mode can be driven and energy stored at the raised or lowered frequency. Similarly, for a desired $TE_{011}$ mode oriented with axial magnetic fields along the y axis (FIG. 4B), perturbations and coupling and tuning on the z axis poles will effect this mode strongly with minimum effect on the z axis oriented mode. Thus, this type of perturbation along with accompanying coupling and tuning will be used to drive and isolate these 90° space oriented modes.

FIG. 11 is a graphical representation of a spherical cavity resonator 25 with outward perturbations 97 at the intersections of the cavity's x, y and z axis with cavity walls. The perturbations could as well be inward perturbations. The perturbations can be in the form of adjustable tuning elements as above-described or fixed perturbations, such as dimples, in the wall of the cavity.

FIG. 12 is graphical representation of a another the use of fixed perturbations in the wall of the cavity for mode orientation. This involves the conceptual cutting of the sphere 25 along three normal planes formed intersecting the origin. The resultant, equal size octants, such as the shown octants 99, 101, 103, 105, are slightly separated with three short cylindrical elongations in the cavity wall, such as elongations 107, 109, to yield a geometry slightly enlarged and distorted from the original sphere. Conversely, the octants can be 'shaved' along the planes to yield a geometry slightly reduced and distorted from the original sphere. These geometries will also align the desired modes. With known positioning, proper coupling can be achieved without undue problems with cross coupling of the modes.

There have thus been described and illustrated certain preferred embodiments of the present invention. Although the present invention has been described and illustrated in considerable detail, it shall be understood that the same is by way of illustration and example only and is not to be taken by way of limitation, the spirit and scope of the present invention being limited only by the terms of the appended claims and their legal equivalents.

What I claim is:

1. A dual mode resonator for a pulse compression system comprising a conductive wall forming an enclosed resonator cavity, said resonator cavity being symmetrical about at least two orthogonal axes of the resonator, a first coupling port in the cavity wall for receiving pulse power from an rf pulse power source that excites a first mode in said cavity, said first coupling port being located at the intersection of the cavity wall with one of the resonator's axes, a second coupling port in said cavity wall for receiving pulse power from an rf pulse power source that is 90 degrees out of phase from the power received at said first coupling port, said second coupling port being located at an intersection of the cavity wall with a resonator axis that is 90 degrees from the axis for said first coupling port for exciting a second mode in said cavity which has a space and phase orthogonal relationship to said first mode, and at least two mode orienting perturbations in the conductive wall of said cavity at locations that fix the orthogonal orientation of the first and second modes excited in said resonator.

2. The dual mode resonator of claim 1 wherein said cavity is generally spherical in shape.

3. The dual mode resonator of claim 1 wherein said mode orienting perturbations are provided in the cavity wall at locations substantially 180 degrees from the first and second coupling ports.

4. The dual mode resonator of claim 1 wherein said mode orienting perturbations are provided in said cavity wall at locations adjacent the region of minimum magnetic and electric field for the two orthogonal modes excited in said cavity.

5. The dual mode resonator of claim 1 wherein the mode orienting perturbations in said cavity wall include dimples in said wall.

6. The dual mode resonator of claim 5 wherein said dimple are outward dimples.

7. The dual mode resonator of claim 1 wherein the mode orienting perturbations in said cavity wall include octant separations at the intersection of the cavity wall with planes formed by the symmetrical axes of the resonator.

8. The dual mode resonator of claim 7 wherein the cavity is generally spherical in shape and the octant separations consist of short straight sections in the cavity wall.

9. The dual mode resonator of claim 1 wherein the mode orienting perturbations in said cavity wall include movable tuning elements for tuning the resonator.

10. The dual mode resonator of claim 9 wherein said movable tuning elements include retractable tuning slugs.

11. The dual mode resonator of claim 9 wherein said movable tuning elements include a movable diaphragm.

12. A dual mode resonator for a pulse compression system comprising a conductive wall forming an enclosed generally spherical resonator cavity, said generally spherical resonator cavity being symmetrical about at least two orthogonal axes of the resonator, a first coupling port in the cavity wall for receiving pulse power from an rf pulse power source that excites a first mode in said cavity, said first coupling port being located at the intersection of the cavity wall with one of the resonator's axes, a second coupling port in said cavity wall for receiving pulse power from an rf pulse power source located at an intersection of the cavity wall with a resonator axis that is 90 degrees from the axis for said first coupling port for exciting a second mode in said cavity which has a space orthogonal relationship to said first mode.

13. The dual mode resonator of claim 12 wherein said cavity wall has at least two mode orienting perturbations in the conductive wall of said cavity at locations that fix the orthogonal orientation of the first and second modes excited in said resonator.

* * * * *

UNITED STATES PATENT AND TRADEMARK OFFICE
CERTIFICATE OF CORRECTION

PATENT NO. : 8,009,707 B2
APPLICATION NO. : 12/714034
DATED : August 30, 2011
INVENTOR(S) : Ray M. Johnson It is certified that error appears in the above-identified patent and that said Letters Patent is hereby corrected as shown below:

In the Specification

In column 2, line 32, --cavity resonators-- should be inserted after “two”.
In column 3, line 67, “denoted a” should read --denoted as--.
In column 4, line 6, “shifted be” should read --shifted by--.
In column 4, line 14, “emerge” should read --emerges--.
In column 4, line 19, “and output” should read --an output--.
In column 4, line 37, “modes which” should read --modes, which--.
In column 4, line 41, “i” should be deleted between “cavity” and “for”.
In column 5, line 5, “degree” should read --degrees--.
In column 5, line 55, “As Fig. 5” should read --In Fig. 5--.
In column 5, line 56, “output port” should read --output as port--.
In column 7, line 45, “of a another the use of” should read --of another use of the--.
In column 7, line 48, --by-- should be inserted between “formed” and “intersecting”.

Signed and Sealed this
Fifteenth Day of October, 2013

Teresa Stanek Rea
*Deputy Director of the United States Patent and Trademark Office*